(12) United States Patent
Farley et al.

(10) Patent No.: US 9,078,099 B2
(45) Date of Patent: Jul. 7, 2015

(54) LOCALIZATION METHOD EMPLOYING RADIO SIGNAL STRENGTH MEASUREMENTS OF ELECTRIC AND GAS METERS

(75) Inventors: Richard O. Farley, San Diego, CA (US); Dimosthenis Kaleas, San Diego, CA (US); Roger M. Ruuspakka, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 13/550,246

(22) Filed: Jul. 16, 2012

(65) Prior Publication Data

US 2014/0018111 A1  Jan. 16, 2014

(51) Int. Cl.
H04W 24/00 (2009.01)
H04W 4/02 (2009.01)
G01S 5/02 (2010.01)

(52) U.S. Cl.
CPC ............. *H04W 4/023* (2013.01); *G01S 5/0252* (2013.01)

(58) Field of Classification Search
CPC ..... H04W 4/008; H04W 4/025; H04W 64/00; H04W 72/085; H04W 4/005; H04W 4/023; G01S 5/0252
USPC ................................ 455/456.1–456.3, 456.6
See application file for complete search history.

(56) References Cited

U.S. PATENT DOCUMENTS

| | | | |
|---|---|---|---|
| 2004/0185873 A1* | 9/2004 | Gilkes et al. | 455/456.2 |
| 2009/0280827 A1* | 11/2009 | Michaud | 455/456.1 |
| 2010/0082464 A1 | 4/2010 | Keefe | |
| 2010/0246419 A1 | 9/2010 | Batta et al. | |
| 2011/0004406 A1 | 1/2011 | Davis | |
| 2011/0092222 A1* | 4/2011 | Kuo et al. | 455/456.1 |
| 2011/0117924 A1 | 5/2011 | Brunner et al. | |
| 2011/0143772 A1 | 6/2011 | Sridhara et al. | |

(Continued)

FOREIGN PATENT DOCUMENTS

| | | |
|---|---|---|
| EP | 2058954 A1 | 5/2009 |
| EP | 2116863 A1 | 11/2009 |

(Continued)

OTHER PUBLICATIONS

Dan A., et al., "Localization with enhanced location accuracy using RSSI in WSN", Advanced Networks and Telecommunications Systems (ANTS), 2011 IEEE 5th International Conference on, IEEE Dec. 18, 2011, pp. 1-6, XP032125665, DOI: 10.1109/ANTS.2011.6163649 ISBN: 978-1-4673-0093-3.

(Continued)

*Primary Examiner* — Dinh P Nguyen
(74) *Attorney, Agent, or Firm* — Jeffrey D. Jacobs

(57) ABSTRACT

Systems, methods, and devices for determining the geospatial position/location of a mobile device by using transmissions from surrounding wireless utility meters and prior knowledge of the locations of the surrounding meters. A mobile device may receive transmissions from a plurality of wireless utility meters, and determine signal strengths and meter identifiers of each of the plurality of wireless utility meters from the received transmissions. The signal strengths and meter identifiers may be compared to data records stored in a wireless utility meter signal signature database to identify a best match data record, which may include geographic coordinates that may be used by the mobile device to determine its current geospatial position and/or location.

32 Claims, 12 Drawing Sheets

(56) References Cited

U.S. PATENT DOCUMENTS

2011/0195701 A1* 8/2011 Cook et al. ............... 455/422.1
2011/0250904 A1* 10/2011 Valletta et al. ........... 455/456.1
2012/0015665 A1 1/2012 Farley et al.

FOREIGN PATENT DOCUMENTS

WO WO-0187279 A2 11/2001
WO WO-0191073 A1 11/2001

OTHER PUBLICATIONS

Dong Y., et al., "The research and application of indoor location algorithm based on wireless sensor network", Communication Software and Networks (ICCSN), 2011 IEEE 3rd International Conference on, IEEE May 27, 2011, pp. 719-722, XP032050372, DOI: 10.1109/ICCSN.2011.6014369 ISBN: 978-1-61284-485-5.

Gu F., et al., "An improved fingerprinting method for localization WLAN-based", Computer Science and Service System (CSSS), 2011 International Conference on, IEEE, Jun. 27, 2011, pp. 2051-2054, XP032005484, DOI: 10.1109/CSSS.2011.5974704, ISBN: 978-1-4244-9762-1.

Hung, M-H., et al., "A ZigBee indoor positioning scheme using signal-index-pair data preprocess method to enhance precision", 2010 IEEE International Conference on Robotics and Automation: ICRA 2010 ; Anchorage, Alaska, USA, May 3-8, 2010, IEEE, Piscataway, NJ, USA, May 3, 2010, pp. 548-553, XP031743065, ISBN: 978-1-4244-5038-1.

International Search Report and Written Opinion—PCT/US2013/050701—ISA/EPO—Jan. 9, 2014.

Kleiminger et al., "Opportunistic Sensing for Smart Heating Control in Private Households," Proceedings of the 2nd International Workshop on Networks of Cooperating Objects (CONET 2011), Apr. 2011.

Marusic, et al., "Home-in-Palm—A mobile service for remote control of household energy consumption," Proceedings of the 2011 11th International Conference on Telecommunications (ConTEL), Jun. 2011.

Ros et al., "Indoor Localisation Using a Context-Aware Dynamic Position Tracking Model," International Journal of Navigation and Observation, vol. 2012, Article ID 293048, 12 pages, 2012. doi:10.1155/2012/293048.

* cited by examiner

LOCALIZATION METHOD EMPLOYING RADIO SIGNAL STRENGTH MEASUREMENTS OF ELECTRIC AND GAS METERS

BACKGROUND

Mobile and wireless communication technologies have seen explosive growth over the past several years. Wireless service providers now offer a wide array of features and services that provide their users with unprecedented levels of access to information, resources, and communications. To keep pace with these service enhancements, mobile electronic devices (e.g., smartphones, tablets, etc.) have become more feature rich, and now commonly include powerful processors, high-speed communications circuitry, global positioning system (GPS) receivers, and other components that enable mobile device users to execute a variety of location-aware mobile software applications (e.g., Yelp®, Twitter® Places, "Find my Friends" on Apple® for iOS 5, Google® Maps, etc.) on their mobile devices. As mobile devices and location-based technologies continue to grow in popularity and use, the geospatial positioning and/or location identification capabilities of mobile devices are expected to become an even more important consideration for mobile device consumers.

Another development in mobile communication technologies has been the development of new methods for using location information and wireless communications to monitor and/or track individuals, equipment, and products. Wireless tracking devices, as well as a the broad range of other small electronic devices, may utilize the power of geolocation information.

SUMMARY

The various embodiments include methods of determining a location of a mobile device without using a global positioning system (GPS) receiver, including receiving in the mobile device transmissions from a plurality of wireless utility meters, determining from the received transmissions signal strengths and meter identifiers of each of the plurality of wireless utility meters, comparing the determined wireless utility meter identifiers and respective signal strengths to a meter signal signature database, in which the meter signal signature database may include a plurality of records that associate a plurality of geographic coordinates with a plurality of wireless utility meter identifiers and respective signal strengths, identifying a best match data record within the meter signal signature database that represents a best match between signal strengths and meter identifiers determined from received transmissions and the plurality of wireless utility meter identifiers and respective signal strengths stored in the best match data record, and using the geographic coordinates of the identified best match data record as the location of the mobile device.

In an embodiment, identifying a best match data record within the meter signal signature database may include determining a database record whose combinations of meter identifiers and signal strength measurements most closely match those of the received transmissions. In a further embodiment, determining a database record whose combinations of meter identifiers and signal strength measurements most closely match those of the received transmissions may include searching the meter signal signature database with the determined wireless utility meter identifiers and respective signal strengths.

In a further embodiment, the method may include receiving a subset of the meter signal signature database in the mobile device corresponding to an approximate location of the mobile device, in which comparing the determined wireless utility meter identifiers and respective signal strengths to a meter signal signature database may include using the subset of the meter signal signature database to accomplish the comparison in the mobile device. In a further embodiment, receiving a subset of the meter signal signature database may include transmitting the approximate location of the mobile device to a server, using the approximate location in the server to identify the subset of the meter signal signature database within a vicinity of the approximate location of the mobile device, and transmitting the subset of the meter signal signature database to the mobile device.

In a further embodiment, transmitting the approximate location of the mobile device may include one of transmitting an identifier of a cell tower or wireless base station with which the mobile device is communicating, transmitting at least one wireless utility meter identifier determined from the received transmissions, transmitting a previously determined location, and transmitting an identifier of the mobile device to enable the server to look up the approximate location of the mobile device from a database of mobile devices. In a further embodiment, the method may include the mobile device transmitting the determined signal strengths and meter identifiers of each of the plurality of wireless utility meters to a server, in which comparing the determined wireless utility meter identifiers and respective signal strengths to a meter signal signature database and identifying a best match data record within the meter signal signature database are accomplished in the server using the received determined signal strengths and meter identifiers, the method further including transmitting the geographic coordinates of the identified best match data record to the mobile device. In a further embodiment, searching the meter signal signature database with the determined wireless utility meter identifiers and respective signal strengths may include searching the meter signal signature database using a particle filter search algorithm.

Various embodiments include methods for generating a meter signal signature database, including receiving in the mobile device transmissions from a plurality of wireless utility meters, determining from the received transmissions signal strengths and meter identifiers of each of the plurality of wireless utility meters, determining a geographic location of the mobile device at a location where the transmissions from the plurality of wireless utility meters was received using a high-accuracy geolocation method, transmitting to a server the determined geographic location of the mobile device and the determined signal strengths and meter identifiers of each of the plurality of wireless utility meters, and storing received geographic locations and wireless utility meter identifiers and signal strengths in the meter signal signature database maintained by the server.

In a further embodiment, the method may include assigning a weight value to at least one of the determined signal strengths and determined geographic location of the mobile device. In a further embodiment, the method may include receiving geographic location, wireless utility meter identifier and correspondingly signal strength information from a plurality of mobile devices, and continuously updating the meter signal signature database based on information received from the plurality of mobile devices. In a further embodiment in which determining a geographic location of the mobile device using a high-accuracy geolocation method may include determining the geographic location using a GPS receiver within the mobile device. In a further embodiment, the method may include computing an error value for the determined geographic location, and assigning a weight value to the determined geographic location based on the computed error value.

Various embodiments include methods determining locations of wireless utility meters, including receiving, in a server, geographic location, wireless utility meter identifier and corresponding signal strength information from a plurality of mobile devices, for each meter identifier, calculating a separation distance between the corresponding meter and each geographic location associated with a signal strength information based upon the corresponding signal strength information, and performing a least squares calculation to determine each meter's location using the calculated separation distances and corresponding geographic locations. In an embodiment, the method may include storing the determined meter location in a meter location database, in which receiving geographic location, wireless utility meter identifier and corresponding signal strength information from a plurality of mobile devices may include accessing a meter signal signature database generated by receiving geographic location, wireless utility meter identifier and corresponding signal strength information from a plurality of mobile devices, and storing received geographic locations and wireless utility meter identifiers and corresponding signal strengths in the meter signal signature database maintained by the server.

In a further embodiment, the method may include assigning a weight value to at least one of the geographic location and signal strength information. In a further embodiment, assigning a weight value to at least one of the geographic location and signal strength information may include assigning a weight value to the signal strength information based on a magnitude of the signal strength, and performing a least squares calculation to determine each meter's location using the calculated separation distances and corresponding geographic locations may include performing a least squares calculation using assigned weight values so that location information associated with greater signal strengths contribute more to the determination of each meter's location. In a further embodiment, assigning a weight value to at least one of the geographic location and signal strength information may include assigning a weight value to the geographic location information based on location determination error probability values, and performing a least squares calculation to determine each meter's location using the calculated separation distances and corresponding geographic locations may include performing a least squares calculation using the assigned weight values so that location information associated with greater location determination error probability values contribute less to the determination of each meter's location.

A further embodiment may include a mobile device that includes a memory and a processor configured with processor executable instructions to perform operations of the methods described above.

A further embodiment may include a server that includes a memory and a processor configured with processor executable instructions to perform operations of the methods described above.

A further embodiment may include a communication system that includes a mobile device having a device processor and a server having a server processor, in which the device processor and/or server processor are configured to perform one or more of the operations of the methods described above.

A further embodiment may include a non-transitory processor-readable storage medium having stored thereon processor-executable instructions configured to cause processors of a server device and/or mobile device to perform one or more of operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
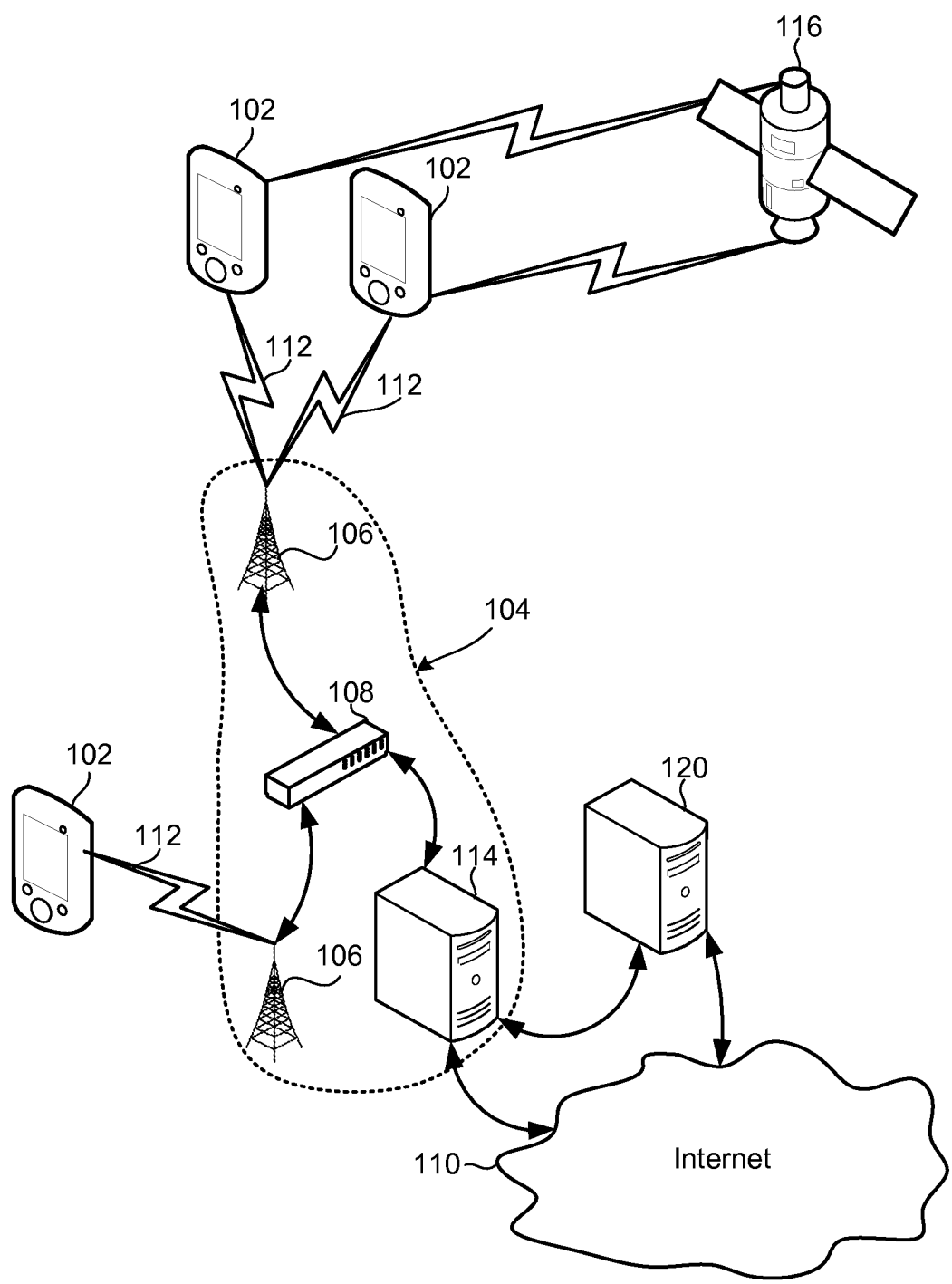
FIG. 1 is a communication system block diagram illustrating network components of an example telecommunication system suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "mobile device," and "wireless device" are used interchangeably herein to refer to any one or all of various cellular telephones, smartphones (e.g., iPhone®), tablet computers (e.g., iPad®), personal or mobile multimedia players, personal data assistants (PDA's), laptop computers, ultrabooks, palm-top computers, wireless electronic mail receivers, multimedia Internet enabled cellular telephones, and wireless gaming controllers, as well as simple electronic devices that include a programmable processor and circuitry for sending and receiving wireless communication signals. The various aspects may be useful in mobile communication devices, such as smartphones, and so such devices are referred to the descriptions of the various embodiments. However, the embodiments may be useful in any electronic devices that may utilize geolocation information and have limited processing power and battery capacity, including simple electronic devices described below with reference to FIG. 9. Therefore, references to mobile devices are not intended to limit the scope of the claims to particular types or forms of electronic devices.

Modern mobile devices (e.g., smartphones) typically include one or more geospatial positioning systems/components for determining the geographic location of the mobile device. Location information obtained by these geospatial systems may be used by location-aware mobile software applications (e.g., Yelp®, Twitter® Places, "Find my Friends" on Apple® for iOS 5, Google® Maps, etc.) to provide users with information regarding the mobile device's physical location at a given point in time. In recent years, such location-based services and software applications have increased in popularity, and now enable mobile device users to navigate foreign cities, read reviews of nearby restaurants, track friends, obtain location-based safety advice, and/or take advantage of many other location-based services, content, data, and communications on their mobile devices.

With the ubiquity of wireless device ownership and usage, mobile device users now expect to have access to location-based services, content, data, and communications at any time, in any place. However, despite recent advances in geospatial technologies, there remain a number of challenges with using existing geospatial technologies on mobile devices.

One of the challenges associated with using geo-spatial positioning technology on a mobile device is that the mobile device's ability to acquire satellite signals and navigation data to calculate a position solution (called "performing a fix") may be hindered when the mobile device is indoors and/or when the satellites are obstructed (e.g., by tall buildings, etc.). For example, the presence of physical obstacles, such as metal beams or walls, may cause multipath interference and signal degradation of the wireless communication signals when the mobile device is indoors or in urban environments that include tall buildings or skyscrapers. In rural environments, the mobile device may not have sufficient access to satellite communications (e.g., to a global positioning system satellite) to effectively ascertain the mobile device's current location. These and other factors often cause existing geospatial technologies to function inaccurately and/or inconsistently on mobile devices, and hinder the mobile device user's ability to fully utilize location-aware mobile software applications and/or other location based services and applications on his/her mobile device.

Another problem with using existing geo-spatial positioning technologies is that mobile devices are generally constrained computing environments that have limited processing power and battery capacity. The operations of obtaining global positioning system (GPS) satellite signals and calculating the mobile device's position is generally a power-intensive process that may drain the mobile device's battery and/or cause the mobile device processor to become sluggish or non-responsive. The battery drain of accessing a GPS receiver to obtain a position determination may be particularly problematic in simple electronic devices that are not easily recharged (e.g., device monitoring and/or tracking devices). Also, GPS receiver chips add cost to simple electronic devices that may be unacceptable in some cost-sensitive applications.

The various embodiments provide methods of determining the current geographic location of a mobile device without requiring the use of a GPS receiver by recognizing device and signal strength patterns in signals received from wireless utility meters. Other embodiments provide methods for determining the location of wireless utility meters by obtaining signal strength measurements and position fixes from a plurality of mobile devices, and using such crowd-source information to calculate most likely meter locations.

The various embodiments may reduce the need for obtaining a GPS fix on the mobile device, improving the mobile device's performance (e.g., time required to determine the position of a mobile device, etc.), location services availability (e.g., available when indoors, etc.), and battery life (e.g., by reducing the drain from the GPS receiver, etc.). The embodiments for determining meter locations may enable generating of a database of wireless meters that may be used in trilateration or multilateration methods and for supporting utilities interested in such data.

Currently, there are numerous initiatives for rolling out smart wireless utility meters (e.g., smart electric and water meters, etc.) that are equipped with low power wireless radios and other technologies (e.g., 802.15.4/Zigbee, 3G, 4G, WWAN, and other similar technologies) for transmitting wireless communication signals. These wireless radios and communication technologies enable the wireless utility meters to broadcast various types of meter information (e.g., utility service usage information, network IDs, status information, etc.) for collection and use by utility companies. Utility companies typically collect such information by driving a vehicle equipped with a receiver and a computer through the neighborhoods in which the wireless utility meters are deployed.

Wireless utility meters are generally stationary devices, and their geographic locations may be identified based on meter and signal strength information obtainable from their wireless transmissions. Various embodiments identify the geographic locations of wireless utility meters and/or use such information to identify a current geographic location of a mobile device.

In an embodiment, a mobile device may be equipped with wireless receiver circuitry (e.g., 802.15.4/Zigbee, 3G, 4G, WWAN, and other similar technologies) for receiving and processing wireless communication signals transmitted from wireless utility meters. The mobile device may collect one or more meter identifiers from each of the received wireless communication signals. The mobile device may also determine the signal strengths of each detected wireless communication signal. The mobile device may use the combination of collected meter identifiers and determined signal strengths to determine its geographic coordinates by comparing this information to a meter signal signature database, which may be stored on the mobile device, on a network server, on the Internet (e.g., in "the cloud"), or on a combination thereof, to identify a data record that most closely matches the meters and signal strengths, and using as its location the geographic coordinates associated with that data record.

In determining its geographic coordinates, the mobile device may automatically collect meter identifiers, identify signal strengths, and/or compute signal strength values in response to detecting the presence of the wireless communication signals. The mobile device may query a meter signal signature database to determine whether the collected meter identifiers correspond to any of the entries in the meter signal signature database. If the mobile device processor determines that at least one of the collected meter identifiers correspond to an entry in the meter signal signature database, the mobile device may compare the collected information with the information stored in the meter signal signature database to ascertain its current position.

In an embodiment, the mobile device may be configured to first attempt to ascertain its position by using information collected from the wireless communication signals of surrounding wireless utility meters and prior knowledge of the surrounding wireless utility meters (e.g., information stored in meter signal signature database, etc.), and only attempt to ascertain its position via other geolocation technologies (e.g., a GPS receiver, etc.) if its location cannot be determined from the collected information.

In an embodiment, the mobile device may be configured to only attempt to ascertain its position by using information collected from the wireless communication signals of surrounding wireless utility meters and a meter signal signature database when it is determined that the mobile device's ability to obtain a GPS fix is hindered (e.g., mobile device is indoors, obstructed, etc.).

In an embodiment, mobile devices may be configured to automatically collect meter identifiers, identify signal strengths and/or compute signal strength values, and determine their geographic coordinates from an accurate source, such as via a GPS receiver, in response to detecting the presence of the wireless communication signals. Having collected meter identifiers, signals strengths, and current location coordinates, the mobile devices may transmit this information to a server. The server may be configured to receive the meter identifiers, signals strengths, and current location coordinates reports, and consolidate, analyze and/or process the information received from the many mobile devices to generate the meter signal signature database. Generating the meter signal signature database by using such a crowd sourcing process (i.e., collecting the information from a plurality of mobile devices working independently) may quickly generate an extensive database at a fraction of the cost that would otherwise be required to determine meter ID, signal strength, and geographic location through direct measurements. The server may continuously receive such meter ID/signal strength/location reports from mobile devices, and continuously update the meter signal signature database as more and better reports are received. In this manner, changes in the signal strengths and locations of wireless utility meters will be promptly reflected in the meter signal signature database.

In a further embodiment, the server may be configured to process the meter identifiers, signals strengths, and current location coordinate reports received from a plurality of mobile devices in order to determine the locations of the wireless utility meters. The locations of wireless utility meters may be determined using trilateration techniques applied to numerous meter ID/signal strength/location data sets. To account for errors in the signal strength measurements and location determinations made by the plurality of reporting mobile devices, the server may assign a weighting factor to the data based on error bands reported by the mobile devices as part of the reports, and based on the variability among the data points collected from all devices. Calculated meter locations may be stored in a meter location database. Generating the meter location database by using such a crowd sourcing process (i.e., collecting the information from a plurality of mobile devices working independently) may quickly generate an extensive database of meter ID's and locations at a fraction of the cost that would otherwise be required to determine meter locations through direct measurements. The server may continuously receive such meter ID/signal strength/location reports from mobile devices, and continuously update the computed locations as more and better reports are received. In this manner, changes in the locations of wireless utility meters will be promptly reflected in the meter location database.

The various embodiments may be implemented within a variety of communication systems, such as a cellular telephone network, an example of which is illustrated in FIG. 1. A typical cellular telephone network 104 includes a plurality of cellular base stations 106 coupled to a network operations center 108, which operates to connect voice and data calls between mobile devices 102 (e.g., mobile phones) and other network destinations, such as via telephone land lines (e.g., a POTS network, not shown) and the Internet 110. Communications between the mobile devices 102 and the cellular telephone network 104 may be accomplished via two-way wireless communication links 112, such as 4G, 3G, CDMA, TDMA, and other cellular telephone communication technologies. The network 104 may also include one or more servers 114 coupled to or within the network 104 that provide connections to the Internet 110, a meter signature database server 120, and/or are used to perform various operations, such as storing and maintaining network information or removing background noises. The mobile devices 102 may receive geo-spatial positioning signals from navigation satellites 116 (e.g., GPS satellites) and use the received signals to identify their geographic positions.

Figure 2:
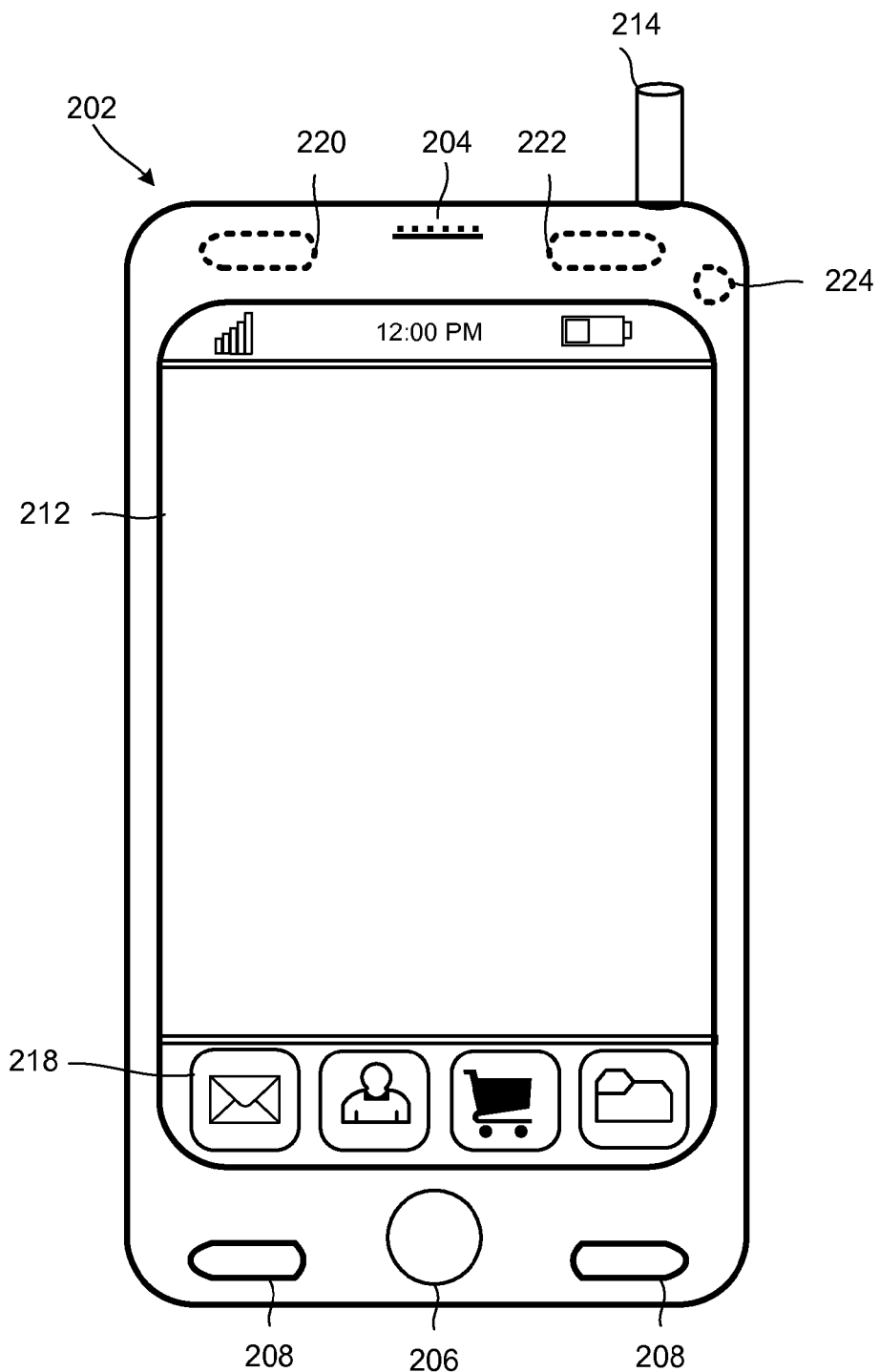
FIG. 2 is an illustration of an example mobile device suitable for detecting wireless utility meter transmissions and uploading geospatial information to a crowd source server in accordance with various embodiments.

FIG. 2 illustrates sample components of a mobile device in the form of a smartphone 202 that may be used with the various embodiments. The smartphone 202 may include a speaker 204, user interface elements 206, 218 for receiving user inputs, one or more microphones 208 for capturing sounds, one or more sensors 220 for monitoring physical conditions (e.g., location, direction, motion/acceleration, orientation, etc.), an antenna 214 for sending and receiving electromagnetic radiation, an electronic display 212, and other well known components (e.g., accelerometer, etc.) of modern electronic devices. The user interface elements 206, 218 (e.g., buttons, icons, etc.) may be implemented as hard key buttons, soft key buttons, as touch keys, or any other way of receiving user input. The smartphone 202 may include a processor and memory for receiving and executing software applications transmitted from an application download server (e.g., Apple® App Store server).

The smartphone 202 may also include a GPS receiver 222 configured to receive GPS signals from GPS satellites to determine the geographic location of the smartphone 202. The smartphone 202 may also include other components/sensors for determining the geographic position/location of the smartphone 202, such as components for determining the radio signal delays (e.g., with respect to cell-phone towers and/or cell sites), performing trilateration and/or multilateration operations, identifying proximity to known networks (e.g., Bluetooth® networks, WLAN networks, WiFi, etc.), and/or for implementing other known geographic location technologies.

The smartphone 202 may further include a wireless receiver circuit 224 for detecting wireless signals transmitted from wireless utility meters. The smartphone 202 may be configured to collect various types of information from the detected wireless signals, such as network identifiers, meter identifiers, signal strengths, etc. The collected information may be stored in a memory on the mobile device (i.e., the smartphone 202), on another communication device, on a server, on the Internet (e.g., in "the cloud"), or on any combination thereof. For example, the smartphone 202 may include one or more memory units (e.g., a non-volatile memory, a Zigbee® subscriber identification module card, etc.) for storing the collected information. In an embodiment, the smartphone 202 may store the collected information in a meter signal signature database of the smartphone 202. In an embodiment, the smartphone 202 may send or upload the collected information to a network server for processing and storage in a meter signal signature database.

Figure 3A:
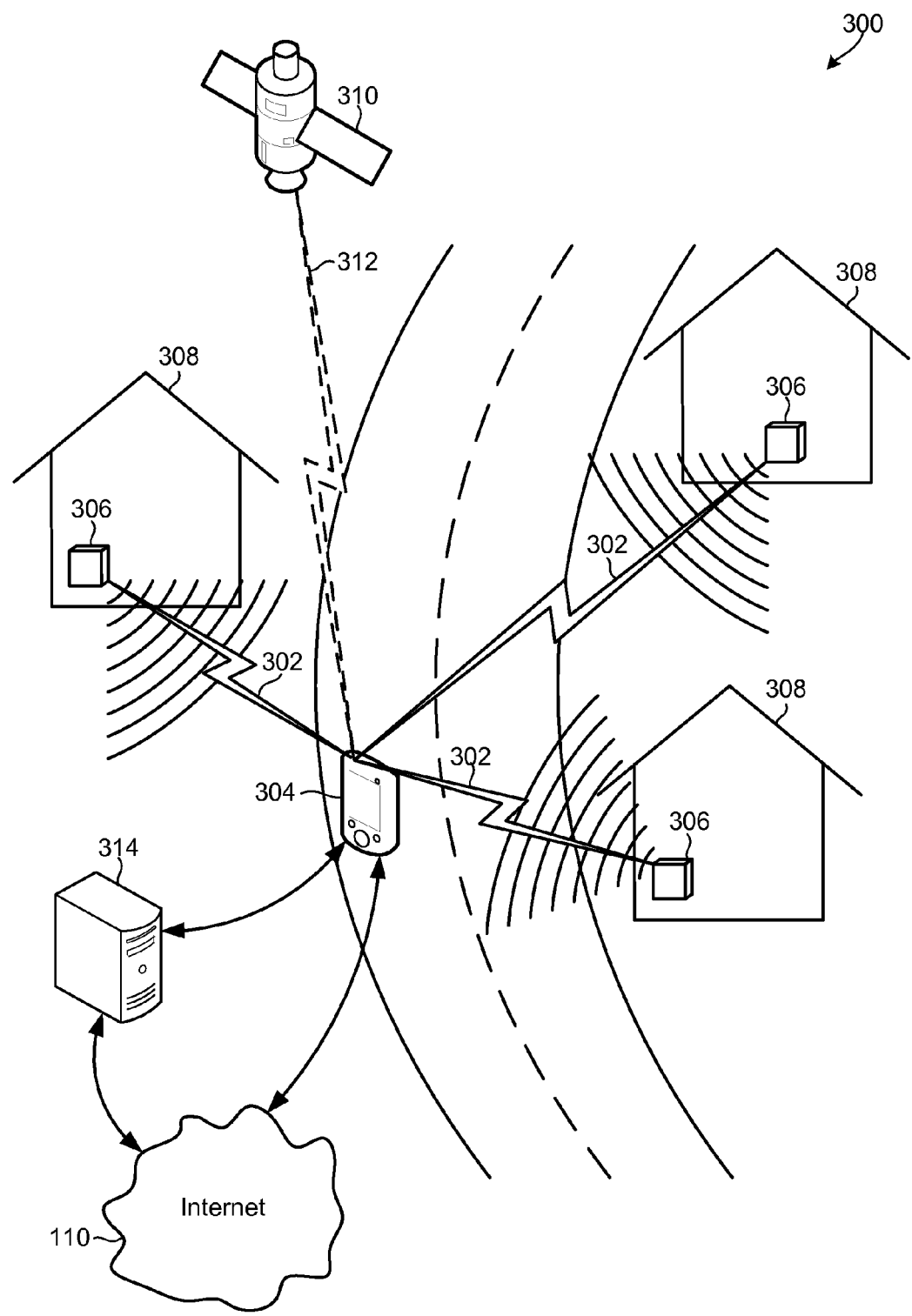
FIG. 3A is a system block diagram illustrating example network components and communications in a communication system suitable for identifying the geographic location of a mobile device relative to the geographic locations of the wireless utility meters in accordance with an embodiment.

FIG. 3A illustrates example network components and communications in a communication system 300 suitable for identifying the geographic location of a mobile device 304 in accordance with an embodiment. In the example illustrated in FIG. 3A, the communication system 300 includes a mobile device 304 and multiple wireless utility meters 306 installed in buildings 308. The wireless utility meters 306 may transmit wireless communication signals 302 from low power wireless radios (e.g., 802.15.4/Zigbee, 3G, 4G, WWAN, and other similar technology radios). The wireless communication signals 302 may encode (or include) various types of meter information, such as media access control (MAC) addresses, meter identifiers, location information, utility usage information, and/or other characteristic information of their respective wireless utility meter 306.

The mobile device 304 may include a compatible radio configured for detecting the wireless communication signals 302 transmitted from wireless utility meters 306. In an embodiment, the mobile device 304 may be configured to automatically detect the wireless communication signals 302 as the mobile device 304 comes within communication range of the wireless utility meters 306, such as when a mobile device user drives by buildings 308 in which the wireless utility meters 306 are located.

When the mobile device 304 detects the presence of wireless communication signals 302, the mobile device 304 may collect meter identifier information (e.g., MAC address, meter identifier, etc.) from the detected wireless communication signal 302 and determine the signal strength characteristics of the received/detected wireless communication signal 302. The meter identifier information may identify the specific wireless utility meter 306 from which the signal 302 was transmitted, and the determined signal strength characteristics may be indicative of the distance from the mobile device 304 to the detected wireless utility meter 306.

In an embodiment, determining the signal strength characteristics of the wireless communication signal 302 may include determining a received signal strength indicator (RSSI) value that is indicative of the power level of the wireless communication signal 302 (e.g., the higher the RSSI value, the stronger the signal).

As mentioned above, each obtained meter identifier may identify a specific wireless utility meter 306. In an embodiment, the mobile device 304 may query a meter signal signature database to determine whether the database stores information pertaining to a received wireless utility meter identifier. The meter signal signature database may be stored on the mobile device 304, on a server 314, or on the Internet 110.

In an embodiment, the mobile device 304 may be configured to estimate its current location based on the meter ID and signal strengths of all of the wireless meters 306 detected by the mobile device 304 that are included in the meter signal signature database. To do this, the mobile device 304 may collect identifier and signal strength information from multiple wireless communication signals 302 originating from multiple wireless utility meters 306. The mobile device 304 may use the meter ID's and relative signal strengths of the detected wireless communication signals 302 to search the meter signal signature database to identify a best match. The record within the meter signal signature database best matching the measured meter IDs and signal strengths may be accessed to obtain the corresponding geographic coordinates, which the mobile device 304 may then use as its position. Thus, by recognizing a best match between measured meter signal strength and records within the meter signal signature database, the mobile device 304 effectively uses the GPS position data obtained by another (or multiple other) mobile device when measuring the signal signatures of the matching record. This allows the mobile device 304 to determine its location without activating its GPS receiver.

In a further embodiment, the mobile device 304 may effectively interpolate between two or more coordinate sets when no single record in the meter signal signature database directly matches the measured meter IDs and signal strengths, but two or more records are close. In this embodiment, relative signal strengths of each meter's signals 302 may be compared to signal strength values in the close-but-not-quite-matching data records of the meter signal signature database to calculate how the data record coordinates may be interpolated to estimate a current location. Since signal strength may be presumed to vary according to the inverse of the square of separation distance, the differences between the measured signal strengths of each meter 306 and the signal strengths in the database records may be used in a quadratic interpolation to calculate an estimated location.

FIG. 3A is also useful for illustrating how the meter signal signature database may be generated by a mobile device 304, or by a plurality of mobile devices working in conjunction with a server 314. When a mobile device 304 is in a data-gathering mode, it may listen for wireless meter broadcast wireless communication signals 302. When one or more wireless meter wireless communication signals 302 are detected, the mobile device 304 may obtain their respective meter IDs and measure their respective signal strengths. At the same time, the mobile device 304 may determine its location accurately, such as by receiving GPS signals 312 from a plurality of GPS satellites 310 in a GPS receiver. As a result of this data-gathering, the mobile device 304 will have a data set that includes its current position as determined by GPS, and a set of meter IDs and respective signal strengths measured at that location.

In an embodiment in which the mobile device 304 builds its own meter signal signature database, the measured meter IDs and respective signal strengths may be added to its database as a new data record. Since it is unlikely that the mobile device 304 will ever measure signals in exactly the same GPS coordinates, the measurements will, in most cases, be added to the database. However, when two or more data records have the same location coordinates, the mobile device 304 may delete one, or average (or weighted average) the two or more sets of signal strength measurements to arrive at a consolidated record for that particular set of geographic coordinates. Then, while operating with the GPS receiver turned off, the mobile device 304 may determine its location by comparing measured meter signal signatures to those stored in the meter signal signature database to find a data record closely matching the measured meter signal strengths and corresponding meter IDs, and using the GPS coordinates stored in that closest matching data record.

In an embodiment, many mobile devices may be configured with software and radio receivers capable of receiving wireless meter broadcast signals may be used to gather wireless meter signal strength measurements and GPS locations, and report those data sets to a remote server. The remote server may aggregate the meter ID/signal strength/GPS coordinate reports from all of the mobile devices in order to generate the meter signal signature database. In this embodiment, each mobile device may perform the operations of identifying meter IDs within received wireless meter broadcast signals, measuring the wireless leader broadcast signals, determining their current location using a highly accurate method, such as a GPS receiver, and transmitting the gathered data to a server. The server may then transmit to mobile devices the meter signal signature database for their use in determining their location when there GPS receiver is turned off.

Figure 3B:
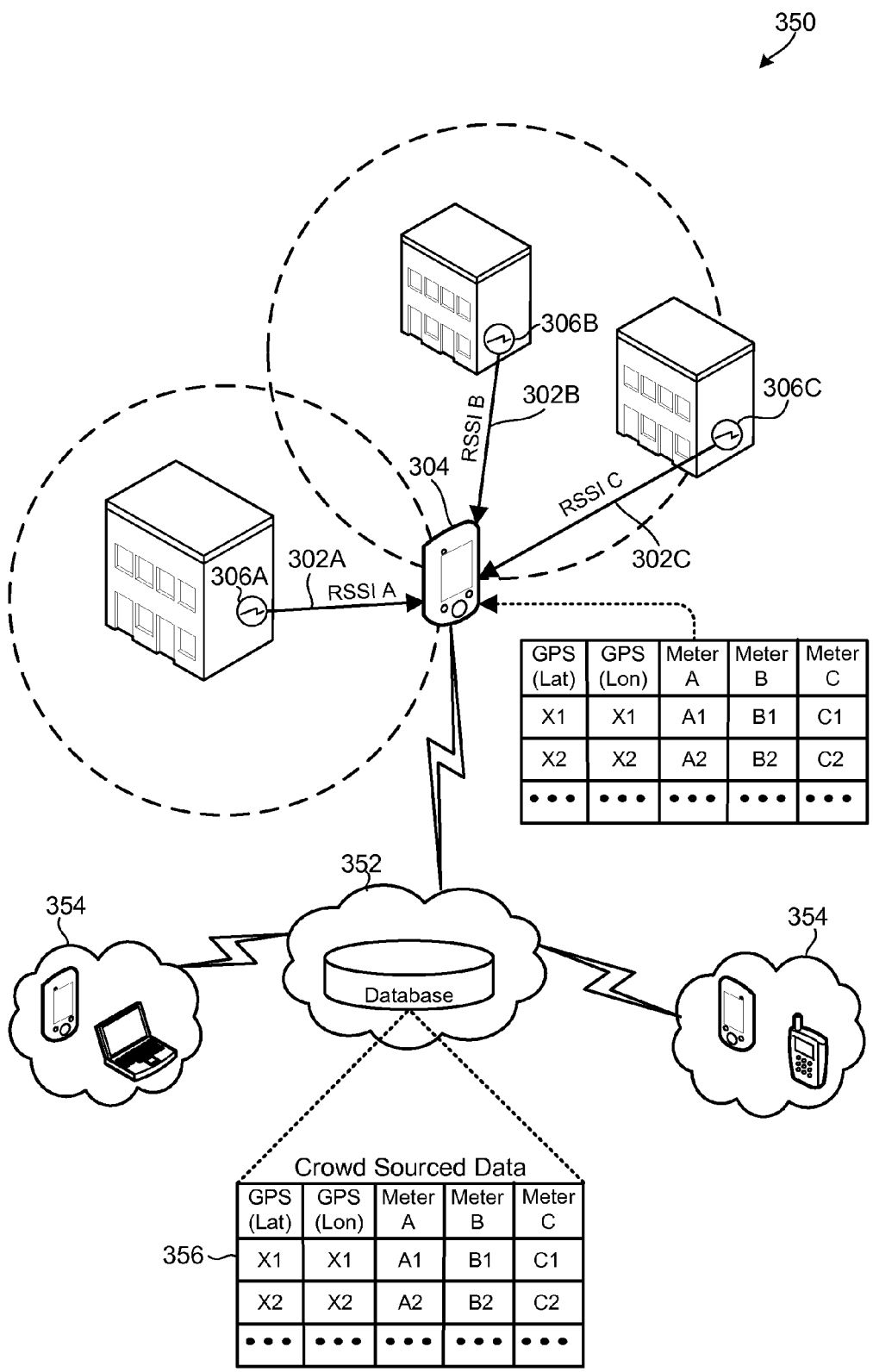
FIG. 3B is another system block diagram illustrating example network components in an example communication system in which crowd sourced data is collected and used to identify the geographic location of a mobile device in accordance with an embodiment.

FIG. 3B illustrates network components in an example communication system 350 in which crowd sourced data 356 is collected and used for generating the meter signal signature database and for identifying the geographic location of a mobile device 304. As discussed above, the mobile device 304 may send meter ID/signal strength/GPS location information to the database server 352, and receive the meter signal signature database from the database server 352. By receiving meter ID/signal strength/GPS location information from a plurality of mobile devices 304, 354, this process enables the server 352 to generate the meter signal signature database using crowd sourced data. The database server 352 may be located on the mobile device 304, on a stand-alone server, on the Internet (e.g., "in the cloud"), or any combination thereof. The crowd sourced data 356 may include location information, signal strength and meter ID information collected from the mobile devices 304, 354. In the example illustrated in FIG. 3B, the crowd sourced data 356 includes global positioning system latitude (lat) and longitude (lon) coordinates for Meter A, Meter B, and Meter C, which correspond to a first, second, and third wireless utility meter 306A, 306B, 306C, respectively.

The database server 352 may receive location information from many different mobile devices 354 and for multiple wireless utility meters 306A-C, and consolidate, analyze and/or process (i.e., crowd source) the meter ID/signal strength/GPS location information reports to generate a consolidated meter signal signature database. For example, the database server 352 may include error bounds on position measurements reported by the mobile devices, and apply waiting factors to signal strength measurements that are determined to be of lower reliability (e.g., weak signals or measurements inconsistent with measurements reported by several other mobile devices). Such crowd sourcing operations allow the information stored in the meter signal signature database to become more refined and/or accurate over time as repeated measurements are preformed and/or additional information is included in the crowd sourcing operations/computations.

In the example illustrated in FIG. 3B, the mobile device 304 is in communication range of multiple wireless utility meters 306A-C, and may detect a first wireless communication signal 302A transmitted from the first wireless utility meter 306A, a second wireless communication signal 302B transmitted from the second wireless utility meter 306B, and a third wireless communication signal 302C transmitted from the third wireless utility meter 306C. The mobile device 304 may extract/obtain meter identifier information (i.e. the meter ID) from each of the detected wireless meter broadcast wireless communication signals 302A-C. The mobile device 304 may also measure or calculate a received signal strength indicator (RSSI) value (e.g., RSSIs A-C) for each of the detected/received wireless communication signals 302A-C. Each signal strength measurement may be an independent sample that is not dependent on previous signal strength measurements.

The mobile device 304 may upload collected, measured, and/or computed information (e.g., collected identifier information, measured signal strengths, computed meter locations, etc.) to the database server 352. In an embodiment, the information may be uploaded anonymously. In an embodiment, the mobile device 304 or the database server 352 may be configured to discard strength measurements/computations that fall below a minimum threshold before the information is uploaded to or stored in the database server 352.

In another embodiment, the database server 352 may use the crowd sourced meter ID/signal strength/GPS location information received from multiple mobile devices 304, 354, which may be stored in the meter signal signature database, to calculate the location of each wireless utility meter 306A-C. This may be accomplished using trilateral methods and estimate distances based on signal strength measurements, an example of which is described below with reference to FIG. 4.

Figure 4:
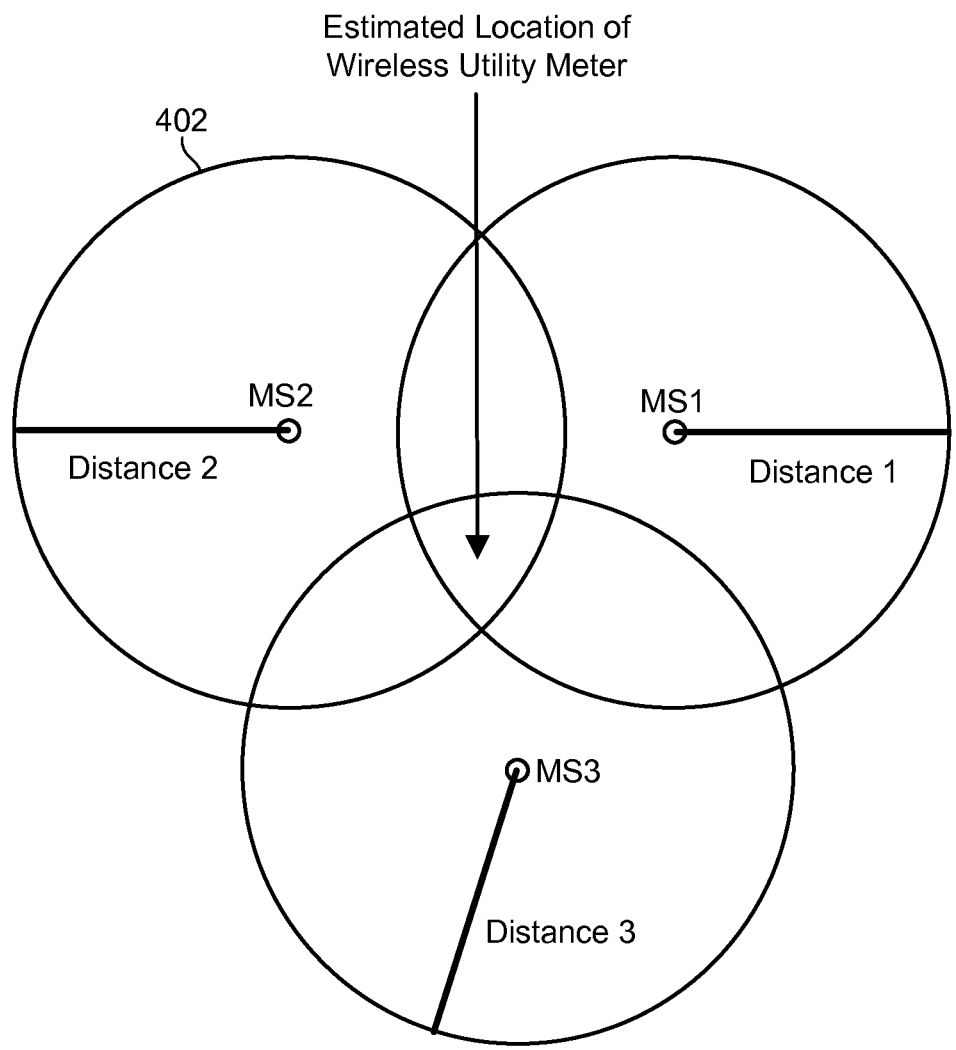
FIG. 4 is a diagram illustrating an embodiment method of performing multi-lateration operations to determine the locations of wireless utility meters based on a constellation of previous mobile signal strength measurements and associated positioning/location coordinates.

FIG. 4 illustrates multilateration calculations that may be used in an embodiment for determining meter locations from a plurality of meter ID, signal strength measurements and measurement location coordinates. Such measurements may be obtained from the meter signal signature database that is generated by a plurality of mobile devices as described above, although the calculations may also be performed as each meter ID/signal strength/GPS location report is received. By basing the multilateration calculations upon a large number of measurements taken from a variety of locations, the process may yield accurate location determinations for a large number of wireless utility meters without having to physically determine the location of each meter. Thus, the embodiment methods may enable a utility to quickly determine the locations of all its wireless meters and permit third-party databases of meter locations to be quickly generated without the expense of direct measurements or dedicated signal measurement vehicles. In a preferred embodiment, the multilateration operations may be performed by a server with access to a meter signal signature database (or a large number of meter ID/signal strength/GPS coordinate reports). However, a mobile device processor may also perform the operations to determine meter locations based upon its own signal strength and GPS location measurements.

The multilateration calculations involve estimating a location of a wireless utility meter based upon estimated distances to the meter from three or more measurement locations. In these calculations, the estimated distance from a measurement location to the meter is derived from the measured signal strength. Since signal strength roughly decreases as the inverse square of the separation distance, and the transmission power of the utility meter can be presumed, the distance $d_i$ can be simply calculated as:

$$d_i = \sqrt{S_0/S_i}$$

where:
$d_i$ is the estimated separation distance between a measurement location and the meter;
$S_i$ is the measured signal strength or RSSI; and
$S_0$ is the strength of the signal transmitted by the wireless meter.

Alternatively, the RSSI readings may be translated into distances using a path loss model, such as the following:

$$RSSI_i = a - 10b \log_{10}(d_i)$$

where:
a is the RSSI at $d_i=1$ meter; and
b is the path loss exponent.

The multilateration operations may include performing a least squares computation, which may accomplished by a processor calculating the following formula:

$$\min_{(x,y)} \Sigma(d_i - \|MS_i - (x,y)\|)^2$$

where:
$d_i$ is the distance calculated based on a measured RSSI or signal strength value;
$MS_i$ corresponds to the know location/position of the mobile device when it measured the RSSI or signal strength value; and
the minimization value of (x, y) is the wireless utility meter's estimated position.

In the example illustrated in FIG. 4, three mobile device locations (MS1, MS2, MS3) are used in performing the multilateration operations, which may include translating three RSSI readings into three distances (Distances 1-3). The estimated location of the wireless utility meter is within the intersection of the circles of radius d (i.e., Distances 1-3). Using a large number of meter ID/signal strength/GPS location data sets within a crowd sourced meter signal signature database, the overlapping circles in a multilateration calculation conducted by a server may be quite large, which should improve the accuracy of the location estimation. In other words, as the number of distinct circles increases, the area of the intersection of all circles will tend to decrease.

In performing the multilateration calculations, the database server 352 may assign a weight value to the location information and signal strength measurements received from each of the mobile devices. Thus, in the least squares fit equation described above, the measured samples may be weighted such that a cutoff occurs for a given accuracy of a location measurement (e.g., GPS location) and/or RSSI level associated with a wireless utility meter, and more reliable measurements are afforded greater contribution to the distance calculation. As is well known, the accuracy of a GPS fix depends upon a number of factors, including the number of satellites in view of the GPS receiver, the duration that the GPS receiver has been receiving satellite signals at its current location, and various atmospheric effects. The GPS receiver may be configured to estimate the error in its determined location based upon these known factors. When the estimated error is reported to the database server 352, the error in the location of the signal measurements may then be taken into account when calculating positions of wireless meters from a plurality of signal strength and location reports. Also, since the relative error in the measured signal strength may increase as signal strength decreases, the location information associated with greater signal strengths may be given greater weight or importance by the database server when calculating meter locations using the crowd sourced data. In this manner, more importance or weight may be assigned to certain measurements/values to improve the accuracy of the accumulated crowd sourced data.

Figure 5:
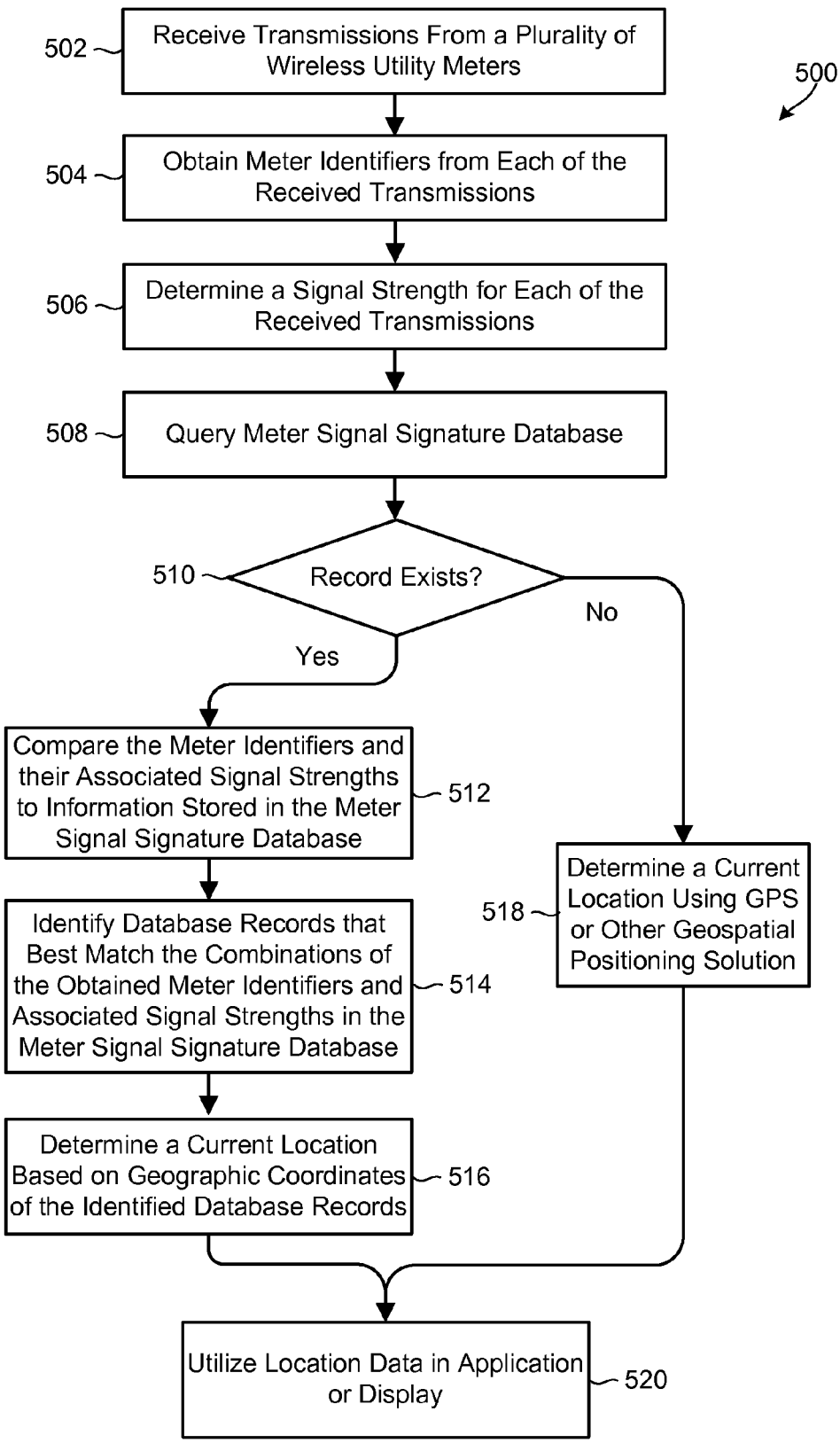
FIG. 5 is a process flow diagram of an embodiment mobile device method of identifying the geographic location of a mobile device relative to the geographic locations of wireless utility meters.

FIG. 5 illustrates an embodiment mobile device method 500 for identifying the geographic location of a mobile device relative to the geographic locations of wireless utility meters, which may be installed in homes or buildings. The operations of method 500 may be performed by one or more mobile device processors, including an application processor, a central processing unit, wireless modem processor, or any combination thereof.

In block 502, a mobile device processor may automatically detect wireless communication signals/transmissions from a plurality of wireless utility meters by, for example, the mobile device user moving into communication range of the plurality of wireless utility meters. In block 504, the mobile device processor may extract/obtain identifier information (e.g., MAC address, meter identifier, etc.) from the detected wireless transmissions identifying the wireless utility meters from which the detected wireless transmissions originate. In block 506, the mobile device processor may determine the signal strength characteristics of the received/detected wireless transmissions. In an embodiment, determining the signal strength characteristics of the wireless transmissions may include measuring/determining a received signal strength indicator (RSSI) value for each of the wireless communication signals (e.g., the higher the RSSI value, the stronger the signal).

In block 508, the mobile device processor may query a meter signal signature database to determine whether the database stores information pertaining the identified wireless utility meter. The meter signal signature database may store database records that associate a plurality of geographic coordinates with a plurality of wireless utility meter identifiers and/or signal strengths. In determination block 510, the mobile device processor may determine whether database records exist in the meter signal signature database for at least one of the obtained meter identifiers. If the mobile device processor determines that database records do not exist for any of the meter identifiers (i.e., determination block 510="No"), in block 518, the mobile device processor may perform more conventional operations to ascertain the mobile device's current locations, such as by instructing a GPS receiver of the mobile device to establish communication links with a GPS satellite to request/receive positioning information for computing the mobile device's current location (e.g., for performing a GPS fix, etc.). In block 520, the mobile device processor may use the determined location information in an application configured to use location data for various purposes. Alternatively or in addition, the processor may display the determined location of the mobile device on a display screen. In an embodiment, an application running on the mobile device processor may upload the computed current location to a server for crowd sourcing and/or use in tracking or providing services to the mobile device.

Operations in blocks 508 and 510 may be optional, particularly when the mobile device is configured with an extensive meter signal signature database, in which case it may be unnecessary to determine whether the meter identifiers obtained from the received wireless meter signals appear in the database.

If the mobile device processor determines that database records exist for at least one of the meter identifiers (i.e., determination block 510="Yes"), in block 512, the mobile device processor may compare the wireless utility meter identifiers and respective signal strengths to the information stored in the meter signal signature database to identify a best match data record. In block 514, the mobile device processor may identify a best match data record within the meter signal signature database. Such a record represents a best match between the signal strength and meter identifiers obtained from received transmissions, and the plurality of wireless utility meter identifiers and signal strengths stored in data records in the meter signal signature database.

In an embodiment, the process of identifying a best match in blocks 512 and/or 514 may include using a particle filter algorithm to sort through the entries in the meter signal signature database. In this algorithm, the mobile device 304 may compare the measured meter ID and signal strengths to the signal strength signature database by treating the database as a constellation of particles that are the measurement records.

In block 516, the mobile device processor may use the geographic coordinates of the identified best match data record as the current location of the mobile device. In block 520, the mobile device processor the mobile device processor may use the determined location information in an application (e.g., forwarding the location information to a server) and/or display the determined location of the mobile device on a display screen.

Figure 6:
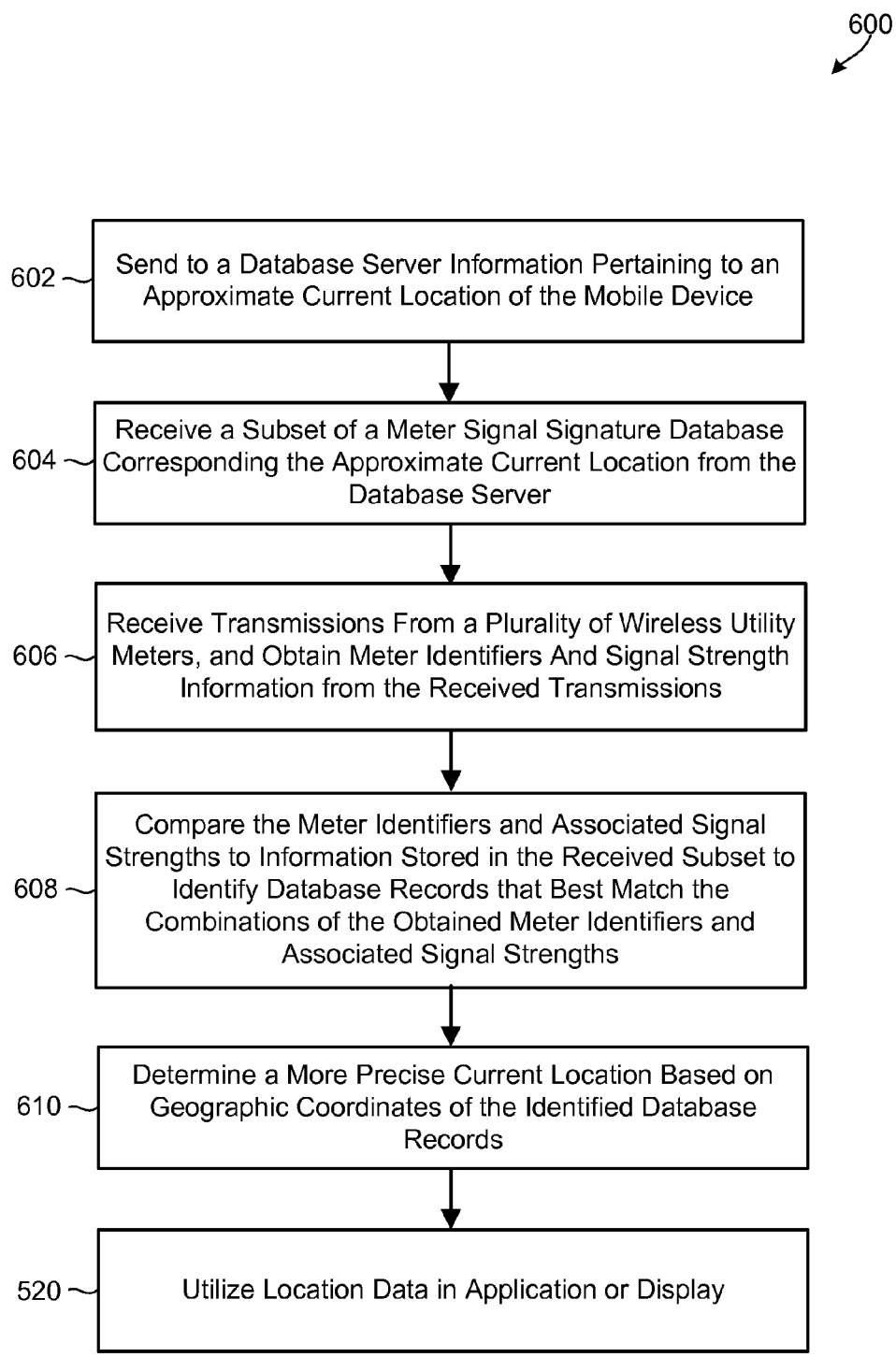
FIG. 6 is a process flow diagram of another embodiment mobile device method of identifying the geographic location of a mobile device relative to the geographic locations of the wireless utility meters.

FIG. 6 illustrates another embodiment mobile device method 600 for identifying the geographic location of a mobile device relative to the geographic locations of the wireless utility meters. The operations of method 600 may be performed by one or more mobile device processors, including an application processor, a central processing unit, wireless modem processor, or any combination thereof.

In block 602, a mobile device processor may send information pertaining to an approximate current location of the mobile device to a database server. In various embodiments, sending approximate current location information may include transmitting an identifier of a cell tower or wireless base station with which the mobile device is communicating, transmitting a wireless utility meter identifier whose location is known, transmitting a previously determined location, and/or transmitting an identifier of the mobile device, any of which may enable the database server to look up an approximate location of the mobile device from a database of mobile devices. In block 604, the mobile device processor may receive a subset of a meter signal signature database (e.g., a plurality of data records, location information, etc.) that corresponds to the approximate current location of the mobile device from the database server.

In block 606, the mobile device processor may detect wireless communication signals/transmissions from a plurality of wireless utility meters, and obtain wireless utility meter identifier and signal strength information from the detected wireless communication signals/transmissions. In block 608, the mobile device processor may compare the wireless utility meter identifiers and respective signal strengths to the information stored in the meter signal signature database to identify a best match data record that represents a best match between the obtained signal strength and meter identifiers and information stored in the meter signal signature database.

In block 610, the mobile device processor may use the geographic coordinates of the identified best match data record as the current location of the mobile device. In block 520, the mobile device processor the mobile device processor may use the determined location information in an application (e.g., forwarding the location information to a server) and/or display the determined location of the mobile device on a display screen.

Figure 7A:
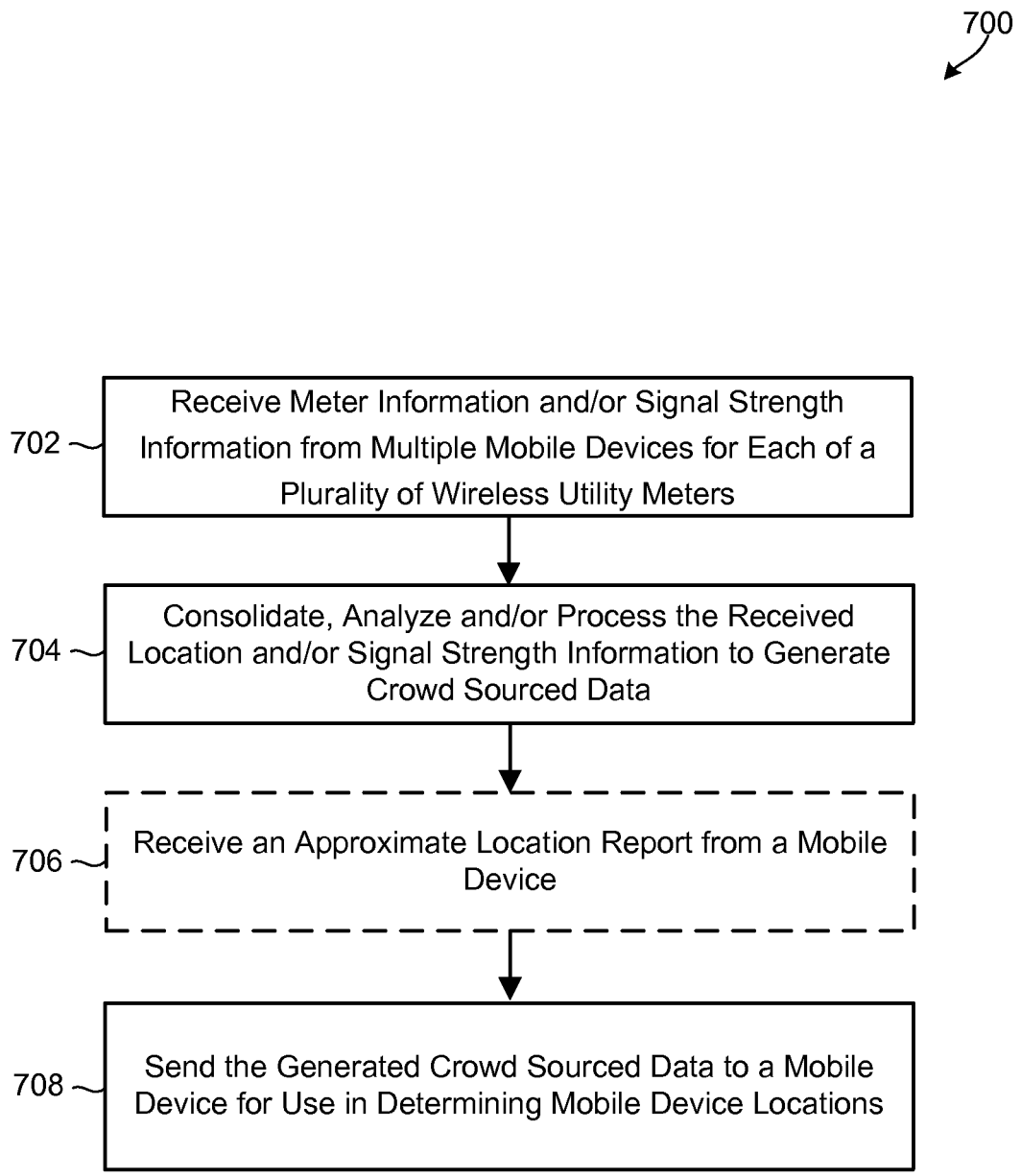
FIG. 7A is a process flow diagram of an embodiment server device method for generating a meter signal signature database from meter ID/signal strength/location reports received from a plurality of mobile devices.

FIG. 7A illustrates an embodiment server method 700 for crowd sourcing information pertaining to the locations of wireless utility meters collected by a plurality of mobile devices for use in identifying geographic locations of other mobile devices. In block 702, a server processor may receive meter information (e.g., meter identifiers, geospatial coordinates, etc.) and/or signal strength information (e.g., received signal strength indicators, etc.) from multiple mobile devices for each of a plurality of wireless utility meters. In block 704, the server processor may consolidate, analyze and/or process (i.e., crowd source) the received location and/or signal strength information to generate a meter signal signature database based on crowd-sourced data. This meter signal signature database may store each set of meter IDs, signal strength and measurement locations received from mobile devices in separate records, since it is unlikely that multiple measurements will be obtained from exactly the same location. Alternatively, the server may process the received meter ID/signal strength/location reports in order to generate a meter signal signature database that includes more accurate sets of location and signal strength information for each individual wireless utility meter. For example, the server processor may average the location values received from multiple mobile devices for a particular wireless utility meter to reducing the impact of an existing incorrect or imprecise value.

In optional block 706, the server processor may receive an approximate location report (e.g., a cell tower or WiFi hotspot identifier) from a mobile device as part of a request for a download of a meter signal signature database, as described above with reference to FIG. 6. In block 708, the server processor may send the generated crowd sourced meter signal signature database to a mobile device for use in determining mobile device and/or wireless utility meter locations. In embodiments in which the mobile device sends to the server an approximate location report when requesting a meter signal signature database download, the meter signal signature database may be a subset of the larger database that encompasses the mobile device's approximate location. Thus, if the mobile device reports its approximate location by transmitting the WiFi identifier of the San Diego International Airport free WiFi service, the server may download a subset of the meter signal signature database that encompasses the greater San Diego area. In this manner, a mobile device of a traveler arriving in San Diego by air may receive the portion of the meter signal signature database that may be useful in the San Diego area. When the traveler returns home, the server may similarly download to the traveler's mobile device the subset of the meter signal signature database corresponding to the traveler's home region.

The server processor may repeatedly perform the operations of blocks 702-704 and 708 as additional information becomes available or as is needed. Thus, as more mobile devices provide location and meter ID/signal strength/measurement location reports, the server processor may update the meter signal signature database, and periodically push out updated versions of the database to subscribing mobile devices.

Figure 7B:
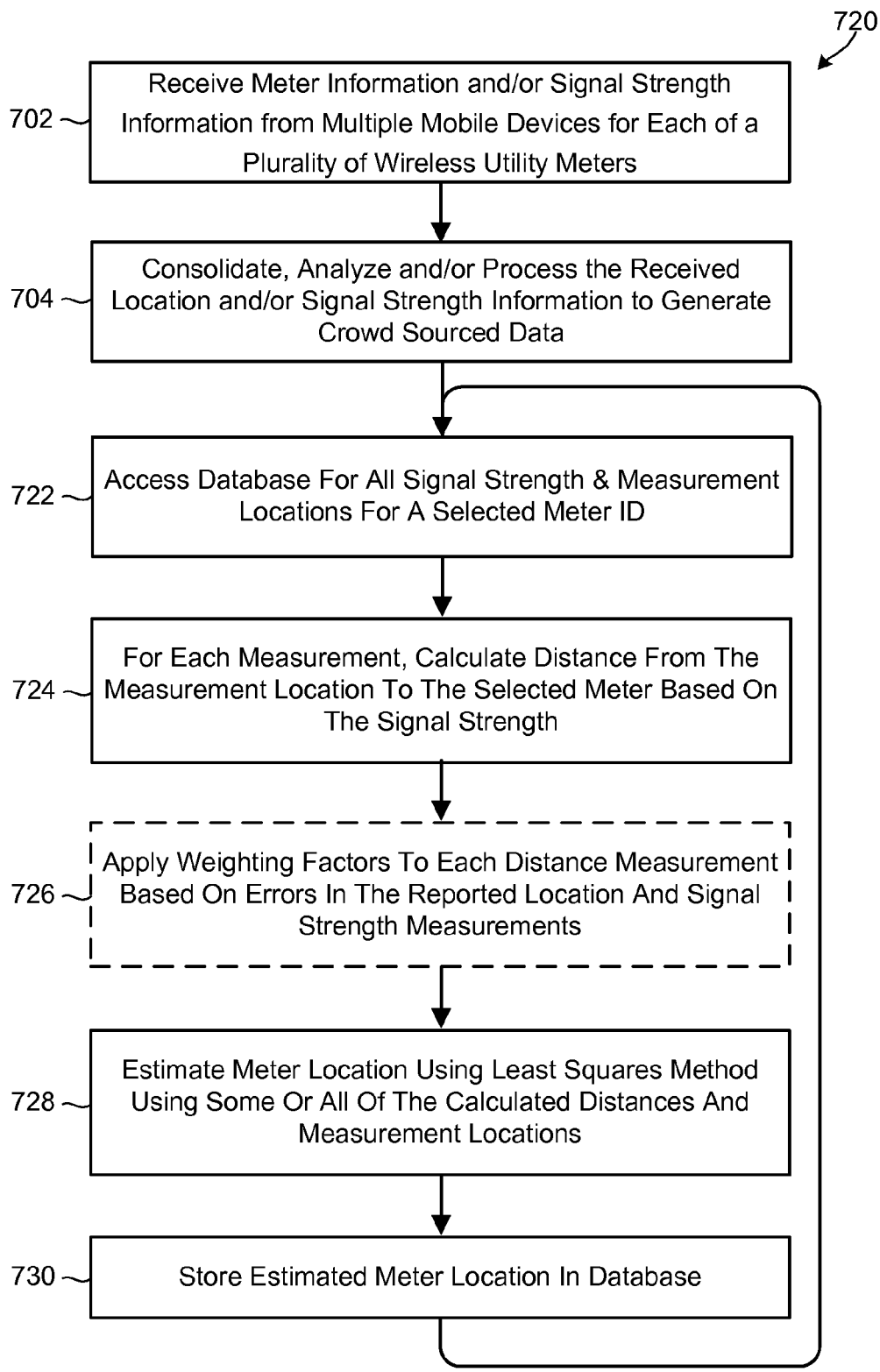
FIG. 7B is a process flow diagram of an embodiment server device method for estimating the locations of wireless utility meters using a meter signal signature database generated from meter ID/signal strength/location reports received from a plurality of mobile devices.

FIG. 7B illustrates an embodiment method 720 by which a server may generate a database of wireless utility meter locations using meter ID/signal strength/measurement location reports such as may be consolidated in a meter signal signature database. In block 702, a server processor may receive meter information (e.g., meter identifiers, geospatial coordinates, etc.) and/or signal strength information (e.g., received signal strength indicators, etc.) from multiple mobile devices for each of a plurality of wireless utility meters. In block 704, the server processor may consolidate, analyze and/or process (i.e., crowd source) the received location and/or signal strength information to generate a meter signal signature database based on crowd-sourced data.

In block 722, the server may begin the process of calculating locations of individual meters by selecting a particular meter or meter ID, and accessing the database for all signal strength values and measurement locations. In block 724, the server may calculate the separation distance between the recorded measurement location and the selected meter based on the recorded signal strength value for each measurement in the database. As part of block 724, the server may exclude measurements that have unreliable data or the calculated separation distance is too large or too small to be accurately estimated by the distance estimating formula.

In optional block 726, the server may apply weighting factors to each distance measurement based on errors in the reported location and/or signal strength measurements as indicated in the database or determined by the server based upon information available to it (e.g., an estimate of the error is a function of signal strength, inconsistency between the calculated distance or measured signal strength and the majority of other data, etc.). As part of this operation, more reliable data may be assigned a higher weighting factor.

In block 728, the server may perform a least squares analysis of all of the calculated meter distance versus measurement location data pairs in order to estimate the selected meter's location. In block 730, the estimated location may be stored in a database of meter locations. The server may continue this process by returning to block 722 to select another meter for analysis, until estimated locations of all meters have been determined.

Figure 8:
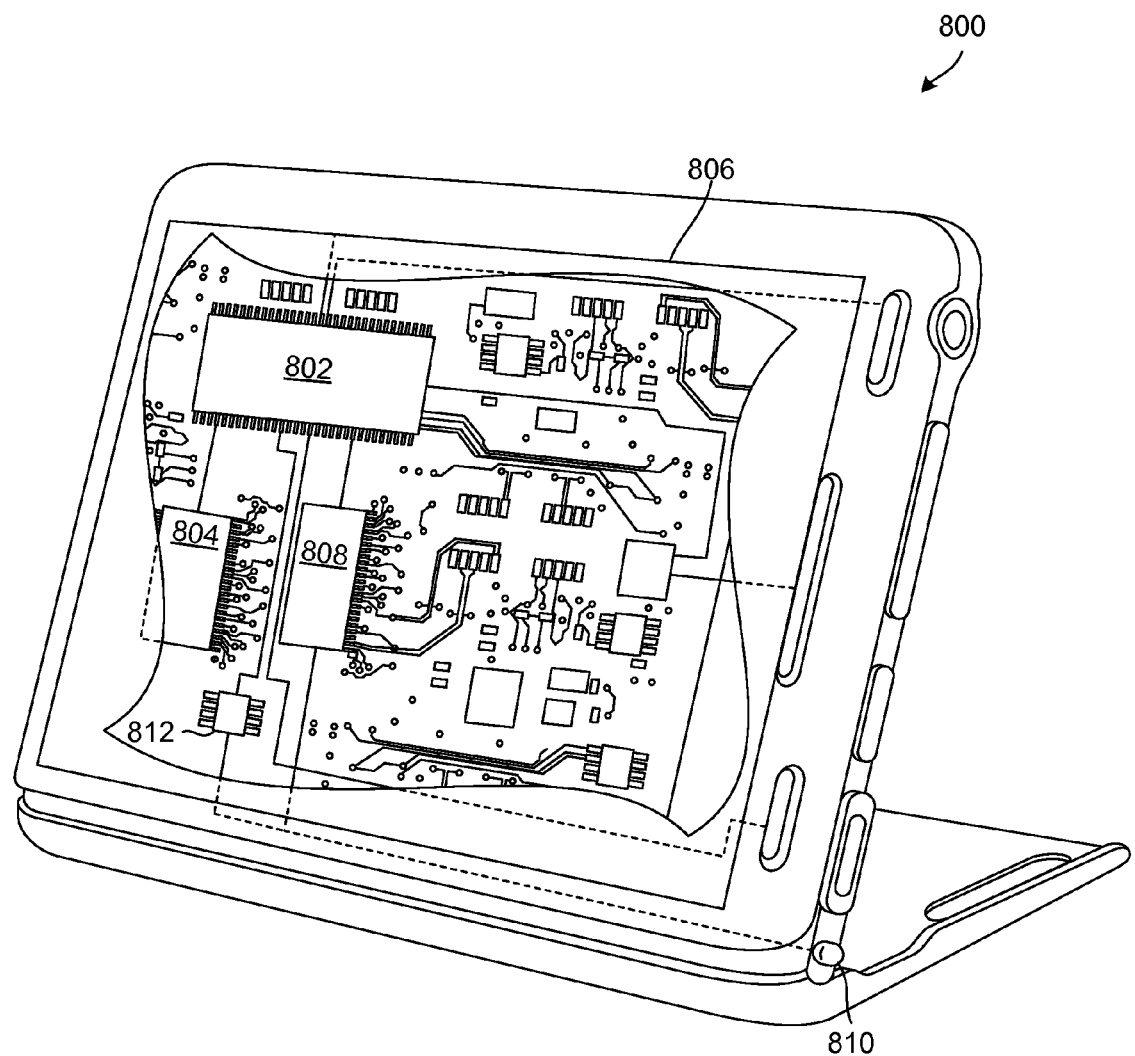
FIG. 8 is a block diagram of an example mobile device suitable for use with the various embodiments.

The various embodiments may be implemented on a variety of mobile devices, such as a smartphone/cell phone 800 illustrated in FIG. 8. The cell phone 800 may include a processor 802 coupled to internal memory 804, and a display 806. Additionally, the smartphone 800 may include an antenna 810 for sending and receiving electromagnetic radiation that may be connected to a wireless data link and/or cellular telephone transceiver 808 and to a GPS receiver 812, each coupled to the processor 802. As described above, the cellular telephone transceiver 808 may be configured to enable the processor 802 to communicate via a wireless data link to a server.

Figure 9:
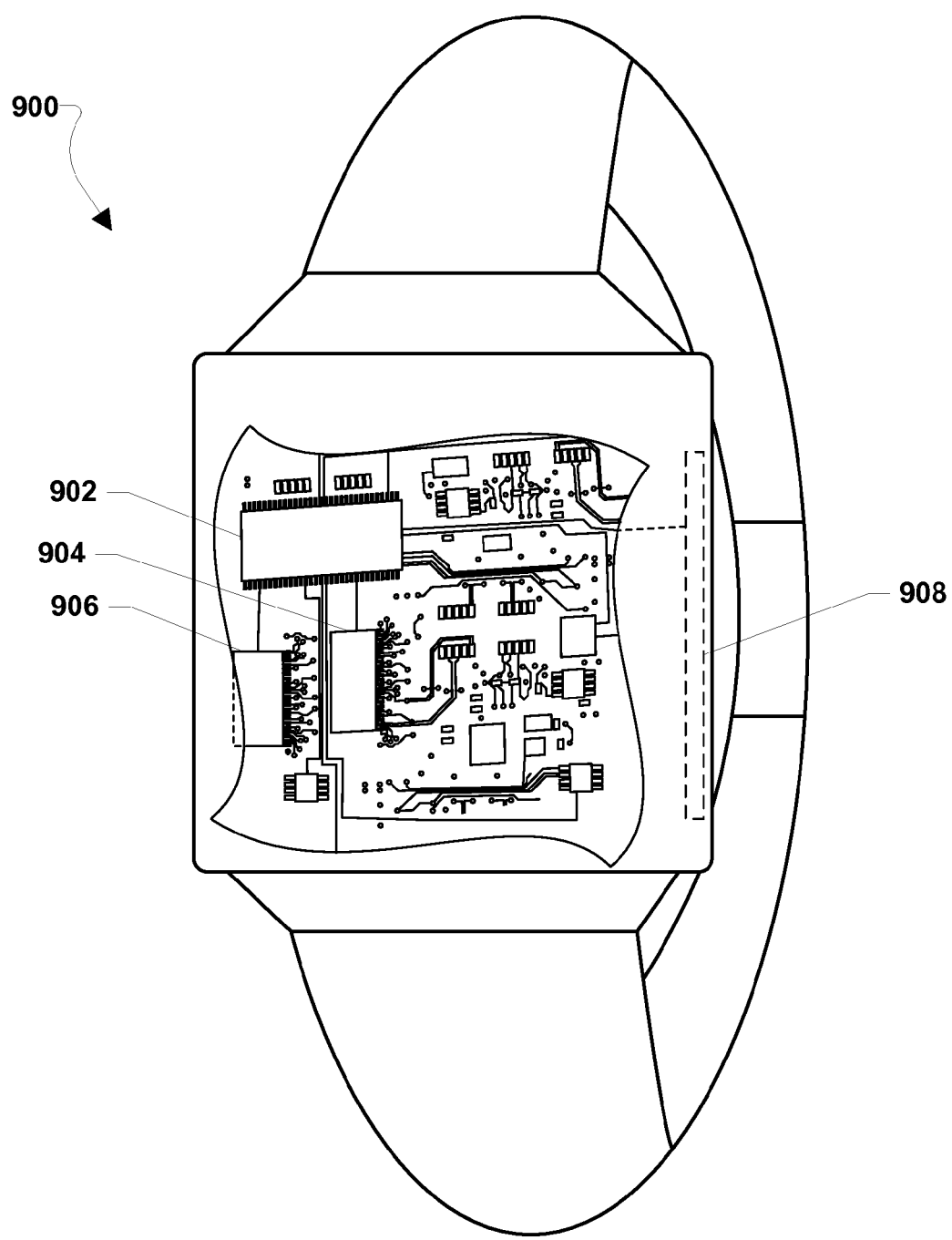
FIG. 9 is a block diagram of an example simple electronic device suitable for use with the various embodiments.

Since the various embodiments enable mobile devices to determine their location without accessing GPS signals, the embodiments may be suitable for enabling simple electronic devices to determine their locations. This may enable the electronic devices to be made less expensive by eliminating a GPS receiver from the device components. For example, simple tracking and/or monitoring devices may utilize the embodiment methods, enabling the devices to use and/or report their location when equipped only with a wireless receiver configured to receive wireless meter signals. FIG. 9 illustrates components of an example of such a simple mobile device 900. For example, a simple mobile device 900, such as an ID wrist band, dog collar, or equipment monitoring tag, may include a processor 902, a memory 904, a radio receiver 906, and an antenna 908 coupled to the radio receiver 906. The memory 904 may be loaded with a meter signal signature database as described above. The radio receiver 906, and the antenna 908 may be configured to receive wireless signals from wireless meter devices. The processor 902, which may be an inexpensive simple processor, may be configured with processor-executable instructions to perform operations of the embodiment methods described above.

Figure 10:
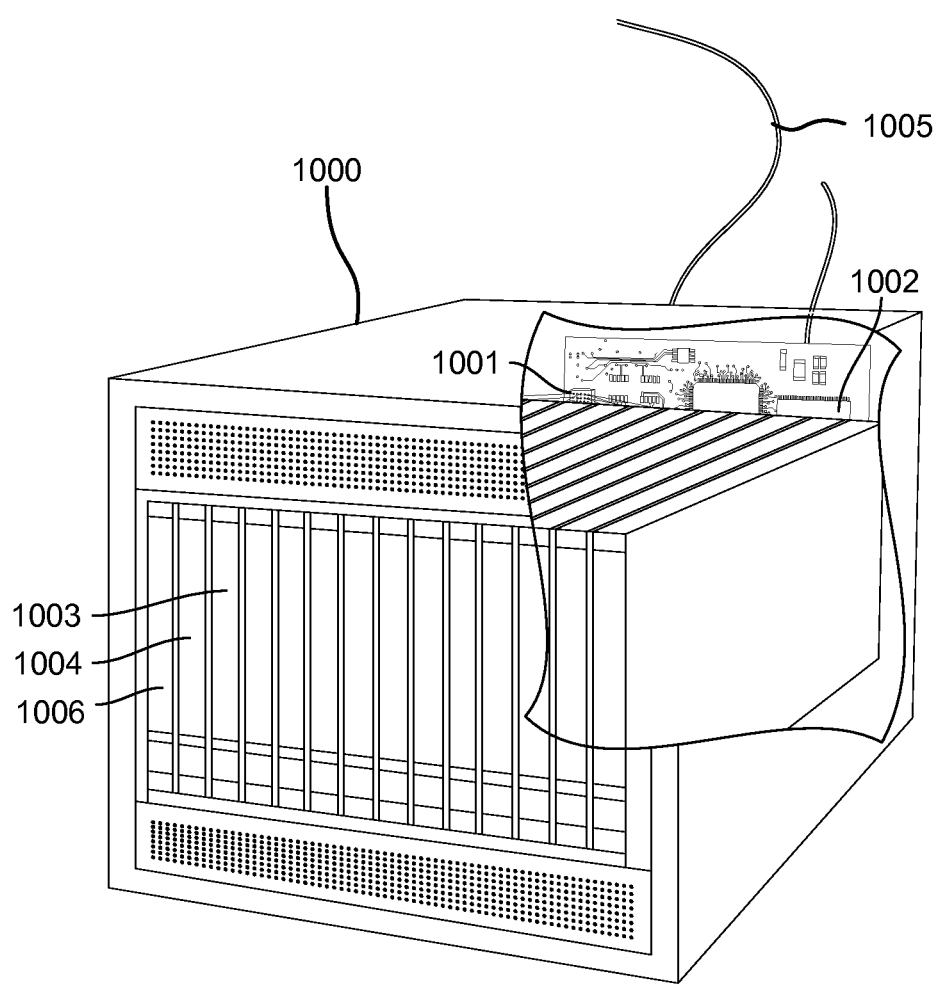
FIG. 10 is a block diagram of an example server computer suitable for use with the various embodiments.

Various embodiments may be implemented on any of a variety of commercially available server devices, such as the server 1000 illustrated in FIG. 10. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1006 coupled to the processor 1001. The server 1000 may also include network access ports 1004 coupled to the processor 1001 for establishing data connections with a network 1005, such as a local area network coupled to other communication system computers and servers.

The processors 802, 902, 1001 may be any programmable microprocessor, microcomputer or multiple processor chip or chips that can be configured by software instructions (applications) to perform a variety of functions, including the functions of the various embodiments described below. Typically, software applications may be stored in the internal memory 804, 904, 1002, 1003 before they are accessed and loaded into the processor 802, 902, 1001. The processor 802, 902, 1001 may include internal memory sufficient to store the application software instructions.

The foregoing method descriptions and the process flow diagrams are provided merely as illustrative examples and are not intended to require or imply that the blocks of the various embodiments must be performed in the order presented. As will be appreciated by one of skill in the art the order of steps in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The blocks or steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the following claims and the principles and novel features disclosed herein.

What is claimed is:

1. A method of determining a location of a mobile device without using a global positioning system (GPS) receiver, comprising:
    receiving, in the mobile device, transmissions from a plurality of wireless utility meters;
    transmitting, by the mobile device, an approximate location of the mobile device to a server;
    receiving, at the mobile device from the server, a subset of a meter signal signature database corresponding to the approximate location of the mobile device, wherein the approximate location of the mobile device is used to identify the subset of the meter signal signature database within a vicinity of the approximate location of the mobile device;
    determining from the received transmissions signal strengths and meter identifiers of each of the plurality of wireless utility meters;
    comparing the determined meter identifiers and respective signal strengths to the received subset of the meter signal signature database, wherein the received subset of the meter signal signature database comprises a plurality of records that associate a plurality of geographic coordinates with a plurality of wireless utility meter identifiers and respective signal strengths;
    identifying a best match data record within the received subset of the meter signal signature database that represents a best match between signal strengths and meter identifiers determined from received transmissions and the plurality of wireless utility meter identifiers and respective signal strengths stored in the best match data record; and
    using geographic coordinates of the identified best match data record as the location of the mobile device.

2. The method of claim 1, wherein identifying a best match data record within the received subset of the meter signal signature database comprises determining a database record whose combinations of meter identifiers and signal strength measurements most closely match those of the received transmissions.

3. The method of claim 2, wherein determining a database record whose combinations of meter identifiers and signal strength measurements most closely match those of the received transmissions comprises searching the received subset of the meter signal signature database with the determined meter identifiers and respective signal strengths.

4. The method of claim 1, wherein transmitting the approximate location of the mobile device comprises one of transmitting an identifier of a cell tower or wireless base station with which the mobile device is communicating, transmitting at least one wireless utility meter identifier determined from the received transmissions, transmitting a previously determined location, and transmitting an identifier of the mobile device to enable the server to look up the approximate location of the mobile device from a database of mobile devices.

5. The method of claim 1, further comprising:
    transmitting the determined signal strengths and meter identifiers of each of the plurality of wireless utility meters to the server; and
    receiving the geographic coordinates of the identified best match data record at the mobile device.

6. The method of claim 3, wherein searching the received subset of the meter signal signature database with the determined meter identifiers and respective signal strengths comprises searching the received subset of the meter signal signature database using a particle filter search algorithm.

7. A mobile device, comprising:
    a transceiver configured to send and receive wireless communication signals; and
    a processor coupled to the transceiver, wherein the processor is configured with processor-executable instructions to perform operations comprising:
        receiving transmissions from a plurality of wireless utility meters;
        transmitting an approximate location of the mobile device to a server;
        receiving, from the server, a subset of a meter signal signature database corresponding to the approximate location of the mobile device, wherein the approximate location of the mobile device is used to identify the subset of the meter signal signature database within a vicinity of the approximate location of the mobile device;
        determining from the received transmissions signal strengths and meter identifiers of each of the plurality of wireless utility meters;
        comparing the determined meter identifiers and respective signal strengths to the received subset of the meter signal signature database, wherein the received subset of the meter signal signature database comprises a plurality of records that associate a plurality of geographic coordinates with a plurality of wireless utility meter identifiers and respective signal strengths;
        identifying a best match data record within the received subset of the meter signal signature database that represents a best match between signal strengths and meter identifiers determined from received transmissions and the plurality of wireless utility meter identifiers and respective signal strengths stored in the best match data record; and
        recording geographic coordinates of the identified best match data record as a mobile device location.

8. The mobile device of claim 7, wherein the processor is configured with processor-executable instructions such that identifying a best match data record within the received subset of the meter signal signature database comprises determining a database record whose combinations of meter identifiers and signal strength measurements most closely match those of the received transmissions.

9. The mobile device of claim 8, wherein the processor is configured with processor-executable instructions such that determining a database record whose combinations of meter identifiers and signal strength measurements most closely match those of the received transmissions comprises searching the received subset of the meter signal signature database with the determined meter identifiers and respective signal strengths.

10. The mobile device of claim 7, wherein the processor is configured with processor-executable instructions such that transmitting the approximate location of the mobile device comprises one of:
- transmitting an identifier of a cell tower or wireless base station with which the mobile device is communicating;
- transmitting at least one wireless utility meter identifier determined from the received transmissions;
- transmitting a previously determined location; and
- transmitting a mobile device identifier.

11. The mobile device of claim 7, wherein the processor is configured with processor-executable instructions to perform operations further comprising:
- transmitting the determined signal strengths and meter identifiers of each of the plurality of wireless utility meters to the server, and
- receiving the geographic coordinates of the identified best match data record in response to transmitting the determined signal strengths and meter identifiers of each of the plurality of wireless utility meters to the server.

12. The mobile device of claim 9, wherein the processor is configured with processor-executable instructions such that searching the received subset of the meter signal signature database with the determined meter identifiers and respective signal strengths comprises searching the received subset of the meter signal signature database using a particle filter search algorithm.

13. A non-transitory computer readable storage medium having stored thereon processor-executable software instructions configured to cause a processor to perform operations for determining a location of a mobile device without using a global positioning system (GPS) receiver, the operations comprising:
- receiving transmissions from a plurality of wireless utility meters;
- transmitting an approximate location of the mobile device to a server;
- receiving, from the server, a subset of a meter signal signature database corresponding to the approximate location of the mobile device, wherein the approximate location of the mobile device is used to identify the subset of the meter signal signature database within a vicinity of the approximate location of the mobile device;
- determining from the received transmissions signal strengths and meter identifiers of each of the plurality of wireless utility meters;
- comparing the determined meter identifiers and respective signal strengths to the received subset of the meter signal signature database, wherein the received subset of the meter signal signature database comprises a plurality of records that associate a plurality of geographic coordinates with a plurality of wireless utility meter identifiers and respective signal strengths;
- identifying a best match data record within the received subset of the meter signal signature database that represents a best match between signal strengths and meter identifiers determined from received transmissions and the plurality of wireless utility meter identifiers and respective signal strengths stored in the best match data record; and
- using geographic coordinates of the identified best match data record as the location of the mobile device.

14. The non-transitory computer readable storage medium of claim 13, wherein the stored processor-executable software instructions are configured to cause the processor to perform operations such that identifying a best match data record within the received subset of the meter signal signature database comprises determining a database record whose combinations of meter identifiers and signal strength measurements most closely match those of the received transmissions.

15. The non-transitory computer readable storage medium of claim 14, wherein the stored processor-executable software instructions are configured to cause the processor to perform operations such that determining a database record whose combinations of meter identifiers and signal strength measurements most closely match those of the received transmissions comprises searching the received subset of the meter signal signature database with the determined meter identifiers and respective signal strengths.

16. The non-transitory computer readable storage medium of claim 13, wherein the stored processor-executable software instructions are configured to cause the processor to perform operations such that transmitting the approximate location of the mobile device comprises one of:
- transmitting an identifier of a cell tower or wireless base station with which the mobile device is communicating;
- transmitting at least one wireless utility meter identifier determined from the received transmissions;
- transmitting a previously determined location; and
- transmitting a mobile device identifier.

17. The non-transitory computer readable storage medium of claim 13, wherein the stored processor-executable software instructions are configured to cause the processor to perform operations comprising:
- transmitting the determined signal strengths and meter identifiers of each of the plurality of wireless utility meters to the server, and
- receiving the geographic coordinates of the identified best match data record from the server in response to transmitting the determined signal strengths and meter identifiers of each of the plurality of wireless utility meters to the server.

18. The non-transitory computer readable storage medium of claim 15, wherein the stored processor-executable software instructions are configured to cause the processor to perform operations such that searching the received subset of the meter signal signature database with the determined meter identifiers and respective signal strengths comprises searching the received subset of the meter signal signature database using a particle filter search algorithm.

19. A mobile device, comprising:
- means for receiving transmissions from a plurality of wireless utility meters;
- means for transmitting an approximate location of the mobile device to a server;
- means for receiving, from the server, a subset of a meter signal signature database corresponding to the approximate location of the mobile device, wherein the approximate location of the mobile device is used to identify the subset of the meter signal signature database within a vicinity of the approximate location of the mobile device;

means for determining from the received transmissions signal strengths and meter identifiers of each of the plurality of wireless utility meters;

means for comparing the determined meter identifiers and respective signal strengths to the received subset of the meter signal signature database, wherein the received subset of the meter signal signature database comprises a plurality of records that associate a plurality of geographic coordinates with a plurality of wireless utility meter identifiers and respective signal strengths;

means for identifying a best match data record within the received subset of the meter signal signature database that represents a best match between signal strengths and meter identifiers determined from received transmissions and the plurality of wireless utility meter identifiers and respective signal strengths stored in the best match data record; and means for using geographic coordinates of the identified best match data record as a mobile device location.

20. The mobile device of claim 19, wherein means for identifying a best match data record within the received subset of the meter signal signature database comprises means for determining a database record whose combinations of meter identifiers and signal strength measurements most closely match those of the received transmissions.

21. The mobile device of claim 20, wherein means for determining a database record whose combinations of meter identifiers and signal strength measurements most closely match those of the received transmissions comprises means for searching the received subset of the meter signal signature database with the determined meter identifiers and respective signal strengths.

22. The mobile device of claim 19, wherein means for transmitting the approximate location of the mobile device comprises one of:
    means for transmitting an identifier of a cell tower or wireless base station with which the mobile device is communicating,
    means for transmitting at least one wireless utility meter identifier determined from the received transmissions,
    means for transmitting a previously determined location, and
    means for transmitting a mobile device identifier.

23. The mobile device of claim 19, further comprising:
    means for transmitting the determined signal strengths and meter identifiers of each of the plurality of wireless utility meters to the server, and
    means for receiving the geographic coordinates of the identified best match data record from the server in response to transmitting the determined signal strengths and meter identifiers of each of the plurality of wireless utility meters to the server.

24. The mobile device of claim 21, wherein means for searching the received subset of the meter signal signature database with the determined meter identifiers and respective signal strengths comprises means for searching the received subset of the meter signal signature database using a particle filter search algorithm.

25. The method of claim 1, wherein the received subset of the meter signal signature database corresponds to a geographical region.

26. The method of claim 1, further comprising receiving, in the mobile device, periodically updated versions of the subset of the meter signal signature database.

27. The mobile device of claim 7, wherein the received subset of the meter signal signature database corresponds to a geographical region.

28. The mobile device of claim 7, wherein the processor is configured with processor-executable instructions further comprising receiving, in the mobile device, periodically updated versions of the subset of the meter signal signature database.

29. The non-transitory computer readable storage medium of claim 13, wherein the received subset of the meter signal signature database corresponds to a geographical region.

30. The non-transitory computer readable storage medium of claim 13, wherein the stored processor-executable software instructions are configured to cause the processor to perform operations further comprising receiving, in the mobile device, periodically updated versions of the subset of the meter signal signature database.

31. The mobile device of claim 19, wherein the received subset of the meter signal signature database corresponds to a geographical region.

32. The mobile device of claim 19, further comprising means for receiving periodically updated versions of the subset of the meter signal signature database.

* * * * *